(12) United States Patent
Bell

(10) Patent No.: US 12,420,539 B2
(45) Date of Patent: Sep. 23, 2025

(54) SINGLE PASS CARPET-PRODUCTION METHOD AND CARPETS PREPARED USING SAME

(71) Applicant: Aladdin Manufacturing Corporation, Calhoun, GA (US)

(72) Inventor: Michael E. Bell, Lexington, VA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 358 days.

(21) Appl. No.: 17/758,440

(22) PCT Filed: Jan. 6, 2021

(86) PCT No.: PCT/US2021/012255
§ 371 (c)(1),
(2) Date: Jul. 6, 2022

(87) PCT Pub. No.: WO2021/141947
PCT Pub. Date: Jul. 15, 2021

(65) Prior Publication Data
US 2023/0024402 A1    Jan. 26, 2023

Related U.S. Application Data

(60) Provisional application No. 62/957,947, filed on Jan. 7, 2020.

(30) Foreign Application Priority Data

Jan. 31, 2020   (EP) ..................................... 20154810

(51) Int. Cl.
*B32B 37/24*      (2006.01)
*A47G 27/02*     (2006.01)
(Continued)

(52) U.S. Cl.
CPC .............. *B32B 37/24* (2013.01); *A47G 27/02* (2013.01); *B32B 5/022* (2013.01); *B32B 5/028* (2013.01);
(Continued)

(58) Field of Classification Search
None
See application file for complete search history.

(56) References Cited

U.S. PATENT DOCUMENTS 3,309,259 A    3/1967  Schwartz
3,887,422 A *  6/1975  Bosniack ................ B32B 11/08
                                                                         524/70
(Continued)

FOREIGN PATENT DOCUMENTS

CA         2410155         12/2001
CN       101472510          7/2009
(Continued)

OTHER PUBLICATIONS

International Search Report and Written Opinion for International Application No. PCT/US2021/012255, dated Mar. 25, 2021, (9 pages), United States Patent and Trademark Office, US.
(Continued)

*Primary Examiner* — Shawn Mckinnon
(74) *Attorney, Agent, or Firm* — Meunier Carlin & Curfman LLC

(57) ABSTRACT

A low-weight carpet or carpet tile and process for making the same, wherein the carpet or carpet tile comprises a facecloth having a plurality of face yarns tufted through a primary backing, a low-viscosity polyolefin coating layer applied to the primary backing, a reinforcing scrim layer, and an extruded polyolefin sheet. The top surface and bottom surface of the carpet tile are defined by the facecloth and either the extruded polyolefin sheet or the reinforcing
(Continued)

scrim layer, respectively. The entire multi-layer web is then passed through a nip to compress the layers together, and the entire web is chilled before optionally being cut into tiles.

20 Claims, 3 Drawing Sheets

(51) Int. Cl.
| | |
|---|---|
| B32B 5/02 | (2006.01) |
| B32B 5/26 | (2006.01) |
| B32B 27/12 | (2006.01) |
| B32B 27/20 | (2006.01) |
| B32B 27/32 | (2006.01) |
| B32B 37/02 | (2006.01) |
| B32B 37/15 | (2006.01) |
| D06N 3/00 | (2006.01) |
| D06N 3/04 | (2006.01) |

(52) U.S. Cl.
CPC ............ *B32B 5/265* (2021.05); *B32B 27/12* (2013.01); *B32B 27/20* (2013.01); *B32B 27/32* (2013.01); *B32B 37/02* (2013.01); *B32B 37/153* (2013.01); *D06N 3/0056* (2013.01); *D06N 3/045* (2013.01); *B32B 2037/243* (2013.01); *B32B 2250/03* (2013.01); *B32B 2255/02* (2013.01); *B32B 2255/26* (2013.01); *B32B 2260/021* (2013.01); *B32B 2260/046* (2013.01); *B32B 2262/101* (2013.01); *B32B 2305/073* (2013.01); *B32B 2305/08* (2013.01); *B32B 2305/30* (2013.01); *B32B 2305/38* (2013.01); *B32B 2305/74* (2013.01); *B32B 2307/718* (2013.01); *B32B 2315/085* (2013.01); *B32B 2323/04* (2013.01); *B32B 2323/10* (2013.01); *B32B 2471/02* (2013.01); *D10B 2503/042* (2013.01)

(56) References Cited

U.S. PATENT DOCUMENTS

| | | | |
|---|---|---|---|
| 3,922,454 | A | 11/1975 | Roecker |
| 4,305,986 | A | 12/1981 | Hartmann et al. |
| 5,204,155 | A | 4/1993 | Bell et al. |
| 5,834,087 | A | 11/1998 | Kajikawa et al. |
| 6,344,254 | B1 | 2/2002 | Smith et al. |
| 6,740,385 | B2 | 5/2004 | Gardner et al. |
| 7,115,315 | B2 | 10/2006 | Fowler |
| 7,338,698 | B1 | 3/2008 | Bieser et al. |
| 8,083,875 | B2 | 12/2011 | Sheppard et al. |
| 8,613,406 | B2 | 12/2013 | Jones et al. |
| 8,617,686 | B2 | 12/2013 | Pepper et al. |
| 9,376,766 | B2 | 6/2016 | Hobbs et al. |
| 11,260,621 | B2 | 3/2022 | Gallman et al. |
| 11,649,587 | B2 | 5/2023 | Gallman et al. |
| 2003/0072911 | A1* | 4/2003 | Higgins ............ B32B 5/245 428/95 |
| 2003/0152741 | A1 | 8/2003 | Robbins et al. |
| 2003/0152742 | A1 | 8/2003 | Shimizu et al. |
| 2006/0014901 | A1* | 1/2006 | Hassan ............ C09J 123/0853 525/191 |
| 2006/0251853 | A1 | 11/2006 | Ingram |
| 2007/0254131 | A1 | 11/2007 | Shail et al. |
| 2007/0286982 | A1 | 12/2007 | Higgins et al. |
| 2008/0213515 | A1 | 9/2008 | Vey et al. |
| 2008/0233336 | A1 | 9/2008 | Giannopoulos et al. |
| 2010/0170991 | A1 | 7/2010 | Hobbs et al. |
| 2010/0260966 | A1 | 10/2010 | McGill |
| 2011/0189427 | A1 | 8/2011 | Wells et al. |
| 2012/0117777 | A1 | 5/2012 | Jones et al. |
| 2014/0134386 | A1 | 5/2014 | Brumbelow et al. |
| 2015/0176201 | A1 | 6/2015 | Flendrig et al. |
| 2016/0032521 | A1 | 2/2016 | Arvidson et al. |
| 2018/0282942 | A1 | 10/2018 | Segars et al. |
| 2019/0077114 | A1 | 3/2019 | Gallman et al. |
| 2019/0309469 | A1 | 10/2019 | Wever |
| 2020/0308762 | A1 | 10/2020 | Gallman et al. |
| 2023/0304220 | A1 | 9/2023 | Gallman et al. |

FOREIGN PATENT DOCUMENTS

| | | |
|---|---|---|
| DE | 3905157 | 10/1989 |
| EP | 0321978 | 6/1989 |
| EP | 1023485 | 8/2000 |
| EP | 2396461 | 12/2011 |
| EP | 3647484 | 5/2020 |
| EP | 3862482 | 8/2021 |
| GB | 1289921 | 9/1972 |
| WO | 1999055954 | 11/1999 |
| WO | WO-2016/018670 A1 | 2/2016 |
| WO | WO-2019/055461 A1 | 3/2019 |

OTHER PUBLICATIONS

International Search Report and Written Opinion issued in PCT/US2021/048882, mailed Nov. 22, 2021, 10 pages.
U.S. Appl. No. 15/703,195, Final Office Action mailed Oct. 21, 2019.
U.S. Appl. No. 15/703,195, Non-Final Office Action mailed Apr. 4, 2019.
U.S. Appl. No. 15/703,195, Requirement for Restriction/Election mailed Jan. 2, 2019.
WIPO Application No. PCT/US2018/050577, PCT International Search Report and Written Opinion of the International Search Authority mailed Dec. 12, 2018.
Final Office Action for U.S. Appl. No. 15/703,195, filed Oct. 28, 2020, (10 pages), United States Patent and Trademark Office, USA.A.
Final Office Action issued in co-pending U.S. Appl. No. 18/296,757, mailed Jul. 26, 2024.
Applicant-Initiated Interview Summary issued in co-pending U.S. Appl. No. 18/296,757, mailed Oct. 8, 2024.
Non-Final Office Action issued in U.S. Appl. No. 18/296,757, mailed Dec. 22, 2023.
Extended European Search Report for European Patent Application No. 20161004.5, dated Oct. 9, 2020, (8 pages), European Patent Office, Munich, Germany.
International Search Report and Written Opinion issued in PCT/US2021/016291, mailed Apr. 15, 2021, 10 pages.
Extended European Search Report for European Patent Application No. 20154810.4, dated Apr. 23, 2020, (7 pages), European Patent Office, Munich, Germany.

* cited by examiner

SINGLE PASS CARPET-PRODUCTION METHOD AND CARPETS PREPARED USING SAME

CROSS REFERENCE TO RELATED APPLICATIONS

The present application is a 35 U.S.C. § 371 national stage of International Application No. PCT/US2021/012255, filed Jan. 6, 2021, which claims the benefit of priority to U.S. Patent Application No. 62/957,947 filed Jan. 7, 2020, and European Patent Application No. 20154810.4 filed on Jan. 31, 2020, the contents of which are hereby incorporated by reference in their entirety for all purposes.

BACKGROUND

The installation techniques traditionally used to install modular carpet components such as carpet tiles puts a large emphasis on the need to ensure that each component is individually flat when installed. Whereas the edges of larger broadloom carpet installations may be positioned adjacent walls and/or may be specifically pinned to a subfloor, the edges of at least some smaller carpet tiles are generally exposed (possibly in the center of a room or high-traffic area) and may not be directly secured relative to their respective neighboring tiles. Thus, manufacturers of carpet tiles must ensure that these tiles do not curl (such that the carpet tile edges curl upward away from the subfloor) or dome (such that the middle of the carpet tile moves upward away from the subfloor) once installed. Each of these possible defects may create trip hazards for individuals walking along the tiled floor, or may create unsightly gaps between adjacent tiles. Even when each carpet tile is individually secured to the underlying subfloor (e.g., via an adhesive), internal forces within the carpet tile tending to curl or dome may cause portions of the tile to break away from the adhesive and the subfloor.

Historically, carpet tiles have been relatively heavy to help ensure each tile remains flat against a subfloor. The weight of each tile is thought to overcome any internal forces tending to curl or dome the carpet tile, thereby ensuring that the tile itself remains flat once installed. However, because carpet tiles are relatively heavy, particularly in comparison to similarly-sized broadloom carpet, transportation and installation of carpet components may be relatively expensive and/or time consuming due to the additional effort needed to maneuver each weighty carpet tile. The weight of carpet tiles has also limited their usage to applications in which weight, once installed, is generally unimportant, such as residential or commercial buildings. Carpet tiles have been particularly challenging for use in the airline industry, in which weight is of paramount importance during the selection of components for installation in aircraft.

Accordingly, a need exists for low-weight and durable carpet tiles having desirable flatness characteristics.

BRIEF SUMMARY

According to the first aspect of the invention, a method of manufacturing a carpet or carpet tile is provided, the method comprising
a) providing a facecloth, wherein the facecloth comprises a primary backing having a plurality of face yarns extending through the primary backing; and
b) forming a multi-layer construction comprising the facecloth and a backing construction secured on a bottom side of the facecloth by:
  i) applying a polyolefinic coating onto the bottom side of the facecloth;
  ii) pressing a first side of a reinforcing scrim layer onto the bottom side of the facecloth; and
  iii) extruding a polyolefin-based resin onto a second side of the reinforcing scrim layer, thereby forming an extruded polyolefin sheet having a top surface which is bonded to the reinforcing scrim layer;
or
  i) applying a polyolefinic coating onto the bottom side of the facecloth;
  ii) extruding a polyolefin-based resin onto the bottom side of the facecloth, thereby forming an extruded polyolefin sheet having a top surface which is bonded to the facecloth; and
  iii) pressing a first side of a reinforcing scrim layer at least partially into a bottom surface of the extruded polyolefin sheet;
wherein the polyolefinic coating has a viscosity less than 2000 mPa·s at 400° F.

According to the second aspect of the invention, a carpet or carpet tile is provided, said carpet or carpet tile being prepared by any of the above methods.

According to the third aspect of the invention, a carpet or carpet tile is provided, said carpet or carpet tile comprising
a facecloth comprising a primary backing and a plurality of face yarns extending through the primary backing, wherein a top side of the facecloth defines an upper surface of the carpet or carpet tile;
a polyolefinic coating absorbed into said face yarns and present on the bottom side of the facecloth;
an extruded polyolefin sheet formed by extruding a polyolefin-based resin; and
a reinforcing scrim layer,
wherein the extruded polyolefin sheet and the reinforcing scrim layer are bonded to each other;
wherein one of the extruded polyolefin sheet and the reinforcing scrim layer are bound to the bottom side of the facecloth, and wherein the other of the extruded polyolefin sheet and the reinforcing scrim layer defines at least a portion of a bottom surface of the carpet or carpet tile; and
wherein the polyolefinic coating has a viscosity less than 2000 mPa·s at 400° F.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
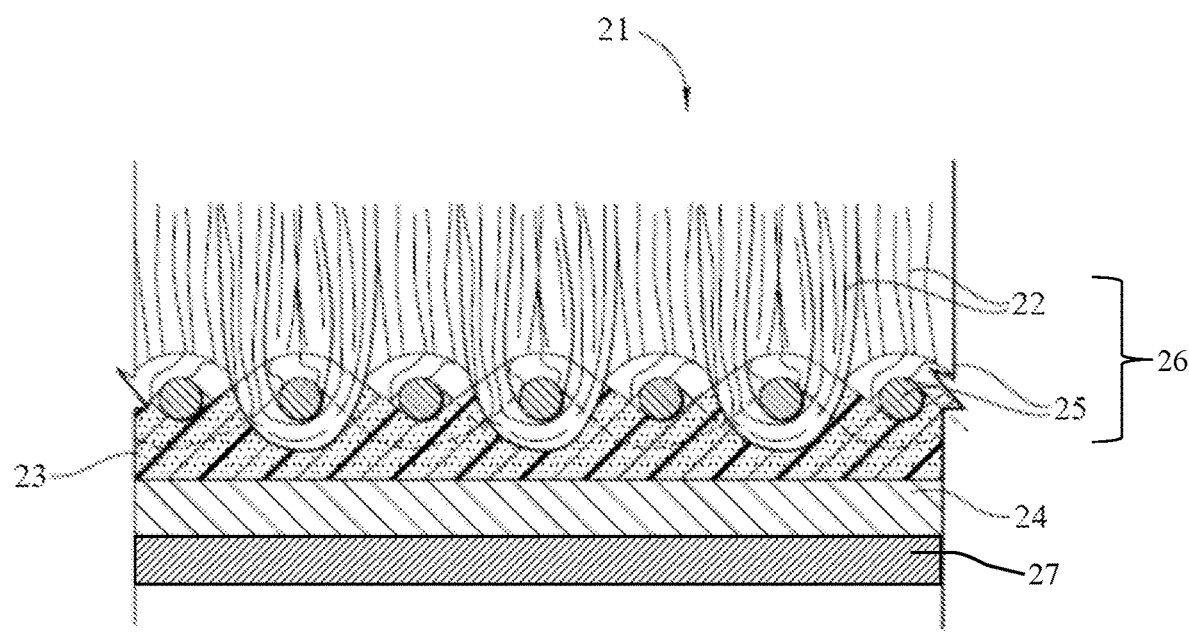
FIG. 1 is a side cutaway view showing various components of a carpet according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

Each embodiment disclosed herein is contemplated as being applicable to each of the other disclosed embodiments. All combinations and sub-combinations of the various elements described herein are within the scope of the embodiments.

As used herein, "about" in the context of a numerical value or range means within ±10% of the numerical value or range recited or claimed.

Various embodiments are directed to a low-weight, dimensionally stable carpet, particularly carpet tiles, that is resistant to both doming and curling. The carpet is a multi-layer carpet comprising a facecloth (comprising a primary backing and face yarn), coated with a low-viscosity polyolefin), bonded to a backing construction comprising a fibrous reinforcing scrim layer (e.g., woven or nonwoven) and an extruded polyolefin sheet, wherein the backing construction defines, at least in part, the bottom surface of the carpet. The low weight carpet product, according to some embodiments, has a total weight of less than 60 ounces per square yard while remaining resistant to deformation (dimensional deformation, curling, or doming) due at least in part to the presence of the reinforcing scrim layer in the backing construction.

According to the first aspect of the invention, a method of manufacturing a carpet or carpet tile is provided, the method comprising
  a) providing a facecloth, wherein the facecloth comprises a primary backing having a plurality of face yarns extending through the primary backing; and
  b) forming a multi-layer construction comprising the facecloth and a backing construction secured on a bottom side of the facecloth by:
    i) applying a polyolefinic coating onto the bottom side of the facecloth;
    ii) pressing a first side of a reinforcing scrim layer onto the bottom side of the facecloth; and
    iii) extruding a polyolefin-based resin onto a second side of the reinforcing scrim layer, thereby forming an extruded polyolefin sheet having a top surface which is bonded to the reinforcing scrim layer;
  or
    i) applying a polyolefinic coating onto the bottom side of the facecloth;
    ii) extruding a polyolefin-based resin onto the bottom side of the facecloth, thereby forming an extruded polyolefin sheet having a top surface which is bonded to the facecloth; and
    iii) pressing a first side of a reinforcing scrim layer at least partially into a bottom surface of the extruded polyolefin sheet;
  wherein the polyolefinic coating has a viscosity less than 2000 mPa·s at 400° F.

According to some embodiments, said polyolefinic coating consists of one or more polyolefins. According to some embodiments, said polyolefinic coating consists of one or more polyolefins and a viscosity-reducing agent. According to some embodiments, said polyolefinic coating consists of one or more polyolefins and a tackifier.

According to some embodiments, said polyolefins comprise repeat units selected from the group consisting of propylene, ethylene, butene, and combinations thereof. According to some further embodiments, said polyolefins comprise propylene repeat units. According to some embodiments, said polyolefins comprise propylene and ethylene repeat units. According to some embodiments, said polyolefins comprise isotactic propylene repeat units.

According to some embodiments, said polyolefin-based resin comprises between about 10-40 wt % polyolefins and between about 20-80 wt % of a filler material.

According to some embodiments, the reinforcing scrim layer comprises a plurality of nonwoven fibers. According to some embodiments, the reinforcing scrim layer comprises a plurality of glass fibers, a plurality of polymer fibers, or a plurality of glass fibers and a plurality of polymer fibers.

According to some embodiments, said polyolefinic coating is applied in an amount of about 8-15 ounces per square yard (about 271-509 grams per square meter).

According to some embodiments, providing a facecloth comprises providing a primary backing web having a weight of about 18-40 ounces per square yard (about 610-1,356 grams per square meter); or wherein the carpet or carpet tile has a weight between about 50-75 ounces per square yard (about 1,695-2543 grams per square meter).

According to the second aspect of the invention, a carpet or carpet tile is provided, said carpet or carpet tile being prepared by any of the above methods.

According to the third aspect of the invention, a carpet or carpet tile is provided, said carpet or carpet tile comprising
  a facecloth comprising a primary backing and a plurality of face yarns extending through the primary backing, wherein a top side of the facecloth defines an upper surface of the carpet or carpet tile;
  a polyolefinic coating absorbed into said face yarns and present on the bottom side of the facecloth;
  an extruded polyolefin sheet formed by extruding a polyolefin-based resin; and
  a reinforcing scrim layer,
  wherein the extruded polyolefin sheet and the reinforcing scrim layer are bonded to each other;
  wherein one of the extruded polyolefin sheet and the reinforcing scrim layer are bound to the bottom side of the facecloth, and wherein the other of the extruded polyolefin sheet and the reinforcing scrim layer defines at least a portion of a bottom surface of the carpet or carpet tile; and
  wherein the polyolefinic coating has a viscosity less than 2000 mPa·s at 400° F.

According to some embodiments, said polyolefinic coating consists of one or more polyolefins. According to some embodiments, said polyolefinic coating consists of one or more polyolefins and a viscosity-reducing agent. According to some embodiments, said polyolefinic coating consists of one or more polyolefins and a tackifier.

According to some embodiments, said polyolefins comprise repeat units selected from the group consisting of propylene, ethylene, butene, and combinations thereof. According to some further embodiments, said polyolefins comprise propylene repeat units. According to some embodiments, said polyolefins comprise propylene and ethylene repeat units. According to some embodiments, said polyolefins comprise isotactic propylene repeat units.

According to some embodiments, said polyolefinic coating is present in an amount of about 8-15 ounces per square yard (about 271-509 grams per square meter).

According to some embodiments, said reinforcing scrim layer comprises a plurality of nonwoven fibers. According to some embodiments, said reinforcing scrim layer comprises a plurality of glass fibers, a plurality of polymer fibers, or a plurality of glass fibers and a plurality of polymer fibers.

According to some embodiments, the weight of the carpet or carpet tile is between about 50-75 ounces per square yard (about 1,695-2,543 grams per square meter). According to some further embodiments, the weight of the carpet is between about 60-70 ounces per square yard (about 2,034-2,373 grams per square meter).

Carpet

Referring to the figures, in which like numerals refer to like elements through the several figures, FIG. 1 illustrates schematically one potential construction of the carpet or carpet tile. It is generally designated by reference numeral 21. The carpet 21 includes face yarn 22, which is tufted into a mesh, woven, or spunbonded fabric known as a primary backing 25. The primary backing 25 has pile yarns 22 tufted therethrough extending outwardly from one face, and has been coated with a polyolefinic coating 23 on the opposite face. The polyolefin-coated face of the primary backing 25 is in contact with one face of a reinforcing scrim layer 24, and the other face of the reinforcing scrim layer 24 is attached to an extruded polyolefinic sheet 27. Other layers may also be associated with the carpet 21. Face yarn 22 and primary backing 25, combined, may be referred to as a facecloth 26.

In making the carpet 21, generally, the fiber tufts are tufted through a woven or non-woven fabric, which is the primary backing 25. The part of the tufts on the exposed surface of the carpet tile comprises the face fiber or face yarn 22. A polyolefinic coating 23 is applied to the opposite side of the facecloth 26 to lock in the tufts. Next, in a single pass, a fiberglass scrim 24 and an extruded polyolefin layer 27 are attached to the coated side of the facecloth 26 to give the carpet tile added dimensional stability. In the embodiment shown in FIG. 1, the reinforcing scrim layer 24 is applied to the primary backing 25 before a polyolefin-based resin is extruded onto the reinforcing scrim layer 24 to form a polyolefinic sheet 27.

The primary backing 25 is a supportive scrim through which the tufts are tufted, and frequently is polyolefin, such as polyethylene or polypropylene; however, other materials such as polyester (including, for example, PET) can be used. For example, slit tapes made from PET may be used. The face yarn 22 may be made from various materials, both natural and synthetic, such as nylon 6, nylon 6, 6, cotton, wool, nylon, acrylic, polyester, polyamides, polypropylene, and other polyolefins. The face weight of the face yarn 22 can be approximately 5 ounces per square yard to approximately 50 ounces per square yard.

The primary backing 25 may be formed from a substrate such as a woven substrate, a tape yarn substrate, and/or other substrate construction that imparts stability to the carpet 21. The substrate may be made from a polyester, such as poly(ethylene terephthalate) [PET], poly(trimethylene terephthalate) [PTT], poly(butylene terephthalate) [PBT], poly (ethylene terephthalate-co-isophthalate), poly(ethylene naphthalenedicaroxylate) [PEN], and copolymers thereof, and/or combinations thereof, with PET being preferred. In certain embodiments, the primary backing 25 may comprise a low melt polyester material configured to bind the various fibers together upon application of heat to the primary backing. The substrate may also comprise sheathed fibers, which may comprise a polyester core surrounded by a polyamide and/or polyolefin sheath. Typically, the polyester core may be made from PET, PTT, PBT, PEN, poly(ethylene terephthalate-co-isophthalate) and copolymers thereof. The polyamide sheath may be made from polycaprolactam [nylon 6], poly(7-heptanamide) [nylon 7], polycapryllactam [nylon 8], poly(9-nonanamide) [nylon 9], poly(tetramethylene adipamide) [nylon 4,6], poly(hexamethylene adipamide) [nylon 6,6], poly(methylene-4,4'-dicyclohexylene dodecanediamede), poly(1,4-cyclohexylenedimethulene suberamide), poly(m-phenylene isophthalamide), and poly(p-phenylene terephthalamide), with polycaprolactam [nylon 6] being the preferred polyamide. In certain embodiments, the primary backing 25 may be formed using a woven substrate using any conventional natural or synthetic woven material, such as cotton, jute, rayon, paper, nylon, polypropylene and other polyolefins, polyamides, polyesters, and the like.

The face yarn 22 may be tufted through the primary backing 25 so that the ends of the face yarn 22 extend in an outwardly direction from the topside of the primary backing 25 to form an upper surface of the carpet 21. Typically the face yarn 22 is tufted into the primary backing 25 at a weight of approximately 2.6 ounces per square yard to approximately 5.9 ounces per square yard, and more preferably approximately 3 ounces per square yard. The tufting may be performed using conventional techniques that are well known in the art. Furthermore, the tufted face yarn 22 loops may be left as uncut to form an uncut pile carpet, cut to form a cut pile carpet, or partially cut to form a tip sheared carpet, as is well known in the art.

As mentioned, the facecloth 26 has a polyolefin coating 23 that is applied to a bottom surface of the primary backing 25. The polyolefin coating 23 penetrates the tufted face yarn 22 and encapsulates individual ends of the yarn bundles to at least partially bind the tufted face yarn 22 to the primary backing 25. This may prevent one end of an individual fiber from being pulled out of the carpet backing during the manufacturing process. The polyolefin coating 23 may consist of polyolefins. The polyolefin coating may also consist of polyolefins and one or more of a tackifier and a viscosity-reducing agent.

In an embodiment, the polyolefins comprise repeat units selected from the group consisting of propylene, ethylene, butene (including one or more of 1-butene, 2-butene, and isobutylene), and combinations thereof. In an embodiment, the polyolefins comprise propylene repeat units. In an embodiment, the polyolefins comprise propylene and ethylene repeat units. In an embodiment, the polyolefins comprise isotactic propylene repeat units. In an embodiment, the polyolefins comprise isotactic propylene repeat units with ethylene repeat units distributed throughout.

The viscosity of the polyolefin coating will be less than 2000 mPa·s at 400° F. A low viscosity is necessary in order to penetrate both the face yarn 22 and the primary backing 25, as well as to penetrate the reinforcing scrim layer 24 in order to interact with the extruded polyolefin sheet 27. In other embodiments, the viscosity will be less than 1900, 1800, 1700, 1600, or 1500 mPa·s at 400° F. In other embodiments, the viscosity is less than 2000, 1900, 1800, 1700, 1600, or 1500 mPa·s as measured at a temperature between 350-425° F.

Viscosities may be dependent on the method of measurement. Throughout the present description and unless otherwise indicated, viscosities are measured via capillary rheometer, using ASTM D3835. The following parameters are preferred:

Temperature: 400° F.
Shear rate: about 300/s
Capillary diameter: 0.001 m
Capillary length: 0.020000 m
Bore diameter: 0.009550 m
Plunger area: 0.72 cm$^2$
Die L/D ratio: 20

The polyolefin coating 23 may be applied to a bottom surface of the primary backing 25 in the range of approximately 2 ounces per square yard to approximately 20 ounces per square yard (approximately 68-678 g/m$^2$), and more preferably in the range of approximately 8 ounces per square yard to approximately 14 ounces per square yard (approximately 271-475 g/m$^2$).

Disposed on a bottom surface of the coated facecloth 26 is a backing construction comprising a reinforcing scrim layer 24 and an extruded polyolefin sheet 27. In FIG. 1, the backing construction is arranged such that the reinforcing scrim layer 24 is positioned between the extruded polyolefin sheet 27 and the facecloth 26. In such an embodiment, a first (top) side of the reinforcing scrim layer 24 is bonded to the facecloth 26 and a second (bottom) side of the reinforcing scrim layer 24 is bonded to the extruded polyolefin sheet 27.

In an alternative embodiment (not pictured), the backing construction is arranged such that the extruded polyolefin sheet 27 is positioned between the reinforcing scrim layer 24 and the facecloth 26. In such an embodiment, a first (top) side of the extruded polyolefin sheet 27 is bonded to the facecloth 26 and a second (bottom) side of the extruded polyolefin sheet 27 is bonded to the reinforcing scrim layer 24.

The extruded polyolefin sheet 27 is embodied as a resin comprising one or more components collectively configured to give the resulting carpet 21, particularly when in the form of a carpet tile, a flat overall appearance without substantial doming (a central portion of the carpet tile rising relative to the edges such that a top surface of the carpet tile is convex) or curling (the edges of the carpet tile rising relative to the central portion such that a top surface of the carpet tile is concave). The resin of the extruded polyolefin sheet 27 may comprise a polyolefin or a mixture of one or more polyolefins, and may further comprise with one or more other polymers. For example, the resin may comprise polyethylene and/or polypropylene. As specific examples, the polyolefin polymer is embodied as 1-propene, ethylene copolymer or ethylene-propylene copolymer. In certain embodiments, the resin of the extruded polyolefin sheet 27 comprises the polyolefin or polyolefin mixture in an amount between about 10-40 wt % of the resin of the extruded polyolefin sheet 27 (and of the extruded polyolefin sheet 27 itself).

The resin used to form the extruded polyolefin sheet 27 may additionally comprise one or more additives, such as an inert filler material, a colorant, an antioxidant, a tackifier, a viscosity modifier, a flame retardant, and/or the like.

The inert filler material may constitute the majority of the resin of the extruded polyolefin sheet 27 (by weight), and may function as a low cost material that adds weight to the extruded polyolefin sheet 27 to aid in forming an at least substantially flat carpet tile 21. For example, the inert filler material may constitute between about 20-80 wt % of the resin and/or the extruded polyolefin sheet 27.

The inert filler material may be made from carbonates such as calcium carbonate ($CaCO_3$), cesium carbonate ($CsCO_3$), strontium carbonate ($SrCO_3$), and magnesium carbonate ($MgCO_3$); sulfates such as barium sulfate ($BaSO_3$); oxides such as iron oxide ($Fe_2O_3$ or $Fe_3O_4$), aluminum oxide ($Al_2O_3$), tungsten oxide ($WO_3$), titanium oxide ($TiO_2$), silicon oxide ($SiO_2$); silicates, such as clay; metal salts; fly ash and the like.

Additionally, the inert filler material may be made completely or in part from post-consumer or post-industrial (pre-consumer) recycled products, such as glass, carpets and/or other recycled materials. In cases where the inert filler is made from recycled glass, the recycled glass is ground into a fine glass powder before it is added as filler. The glass cullet may be made from automotive and architectural glass, also known as plate glass, flint glass, E glass, borosilicate glass, brown glass (bottle glass), green glass (bottle glass), and coal fly ash, or a combination thereof. In the case where recycled carpet is used as the inert filler material, the recycled carpet maybe ground into a fine cullet and added to the hot melt adhesive. In addition to the recycled carpet, remnants and trimmings of carpet (e.g., comprising trim waste from cutting carpet tiles from rolls of carpet, sometimes referred to as window waste), fine waste fibers that are a result of the shearing process, and the like, that are produced as a by-product during the manufacturing process may also be used to form the inert filler material.

The filled or unfilled polymer may also contain a colorant, such as carbon black or another colorant(s) to provide color and increase the opaqueness of the extruded polyolefin sheet 27. Typically, the colorant may be present in an amount less than or equal to approximately 1 wt % the filled or unfilled resin and extruded polyolefin sheet 27. For example, the colorant may be present in an amount between about 0.1-0.5 wt % of the extruded polyolefin sheet 27. As a specific example, the colorant may be present in an amount of approximately 0.1 wt % of the resin and the extruded polyolefin sheet 27.

Moreover, to reduce the possibility of thermo-oxidation degradation, the polymer in the resin may also contain one or more antioxidants. Some suitable antioxidants include, but are not limited to amines, 2,2'-methylene bis-(4-methyl-6-tert-butylphenol), 2,4,6-tri-tert-butylphenol, 2,6-di-tert-butyl-4-methylphenol, 4,4'-thio-bis-(6-tert-butyl-m-cresol), butylated hydroxy anisole, butylated hydroxy toluene, bis (hydrogenated tallow alkyl),oxide; tris(2,4-ditert-butylphenyl)phosphite and 1,3,5 triazine-2,4,6(1H, 3H, 5H)-trione, 1,3,5,tris ((3,5 (1 dimethylethyl))-4-hydroxyphenyl)methyl. Typically, the antioxidant may be present in the filled or unfilled extruded polyolefin sheet 27 in an amount less than or equal to approximately 2 wt % of the resin and/or the extruded polyolefin sheet 27, such as between about 0.05-0.5 wt % of the resin and/or the extruded polyolefin sheet 27.

Moreover, the extruded polyolefin sheet 27 may additionally include one or more tackifiers to aid in forming a strong mechanical bond with the polyolefin coating 23, the primary backing 25, and/or the reinforcing scrim layer 24 discussed in further detail below.

The resin of the extruded polyolefin sheet 27 may additionally include one or more viscosity modifiers and/or compatibilizers, such as, for example, olefins of higher or lower molecular weight than the resin discussed herein or ethylene maleic anhydride copolymer, to ensure proper flow and bonding of the resin within filler and polymers when applying onto a reinforcing scrim 24. The viscosity modifier may be present in an amount between about 0.1-3 wt % of the resin and the extruded polyolefin sheet 27.

In certain embodiments, the resin of the extruded polyolefin sheet 27 may additionally comprise one or more flame retardants, such as, but not limited to, aluminum trihydrate (ATH) or magnesium hydroxide (MgOH) for applications where flame-retardancy is desired. One or more flame retardants may be necessary to comply with applicable regulations regarding the installation and/or usage of carpet tiles in certain applications, for example, when such carpet tiles are installed in transportation vehicles (e.g., buses, aircraft, and/or the like).

In an alternative embodiment, no extruded polyolefin sheet is present, and the reinforcing scrim forms the bottom of the carpet Referring again to FIG. 1, the carpet 21 additionally comprises a reinforcing scrim layer 24. The reinforcing scrim layer 24 imparts dimensional stability to the finished carpet tile 21. The reinforcing scrim layer 24 provides additional support against curling and/or doming of the carpet tile. In embodiments where the reinforcing scrim layer 24 is positioned on the bottom surface of the carpet tile 21, the reinforcing scrim layer 24 may additionally provide benefits in terms of cushioning, acoustic, and moisture transport properties.

The reinforcing scrim layer 24 may comprise a fibrous material provided in either a woven or non-woven configuration. Particularly when provided on the bottom surface of the carpet tile 21, a woven fibrous reinforcing scrim layer 24 contributes to providing desirable flatness characteristics to the resulting carpet 21 while nonwoven fibrous materials aid in preventing shrinkage or expansion of the resulting carpet 21, particularly when the carpet 21 is in the form of a carpet tile. The desirable flatness characteristics may be at least substantially free from doming (a central portion of the carpet tile rising relative to the edges to provide a convex top surface of the carpet tile) or curling (the edges of the carpet tile rising relative to the central portion to provide a concave top surface of the carpet tile) that traditionally results from providing a polymer backing on a carpet tile. As certain polymers cool and/or harden on a back of a carpet 21, those polymers tend to shrink and pull other portions of the carpet 21 (causing a carpet tile having such a construction to deform and dome) or expand and pull other portions of the carpet 21 (causing the carpet tile to deform and curl). Placing a reinforcing scrim layer 24 on the bottom portion of carpet 21 counteracts the deformation forces on the carpet 21 caused by the polymer backing cooling and hardening. Given these two distinct characteristics of woven and non-woven fibrous scrim materials, certain carpet 21 may comprise a reinforcing scrim layer 24 comprising both woven and nonwoven fibrous materials.

The fibrous materials themselves may constitute any number of natural or synthetic materials. For example, the fibrous materials may be embodied as glass fibers. The fibrous material may additionally and/or alternatively comprise one or more polymer based fibers, such as polyester fibers, polyamide fibers, polyurethane fibers, combinations thereof, and/or the like. For example, the polymer fibers may comprise polypropylene fibers, polyethylene fibers, sheathed polymer fibers (e.g., having a polyethylene core and a nylon or polypropylene sheath), and/or the like. As yet another example, the fibrous material may comprise a composite of polymer-based fibers and other fibers (e.g., glass fibers). Such a composite may comprise layers of nonwoven and/or woven layers (e.g., a first layer comprising a polymer-based fiber material and a second layer comprising a glass fiber material).

Method of Manufacture

Figure 2:
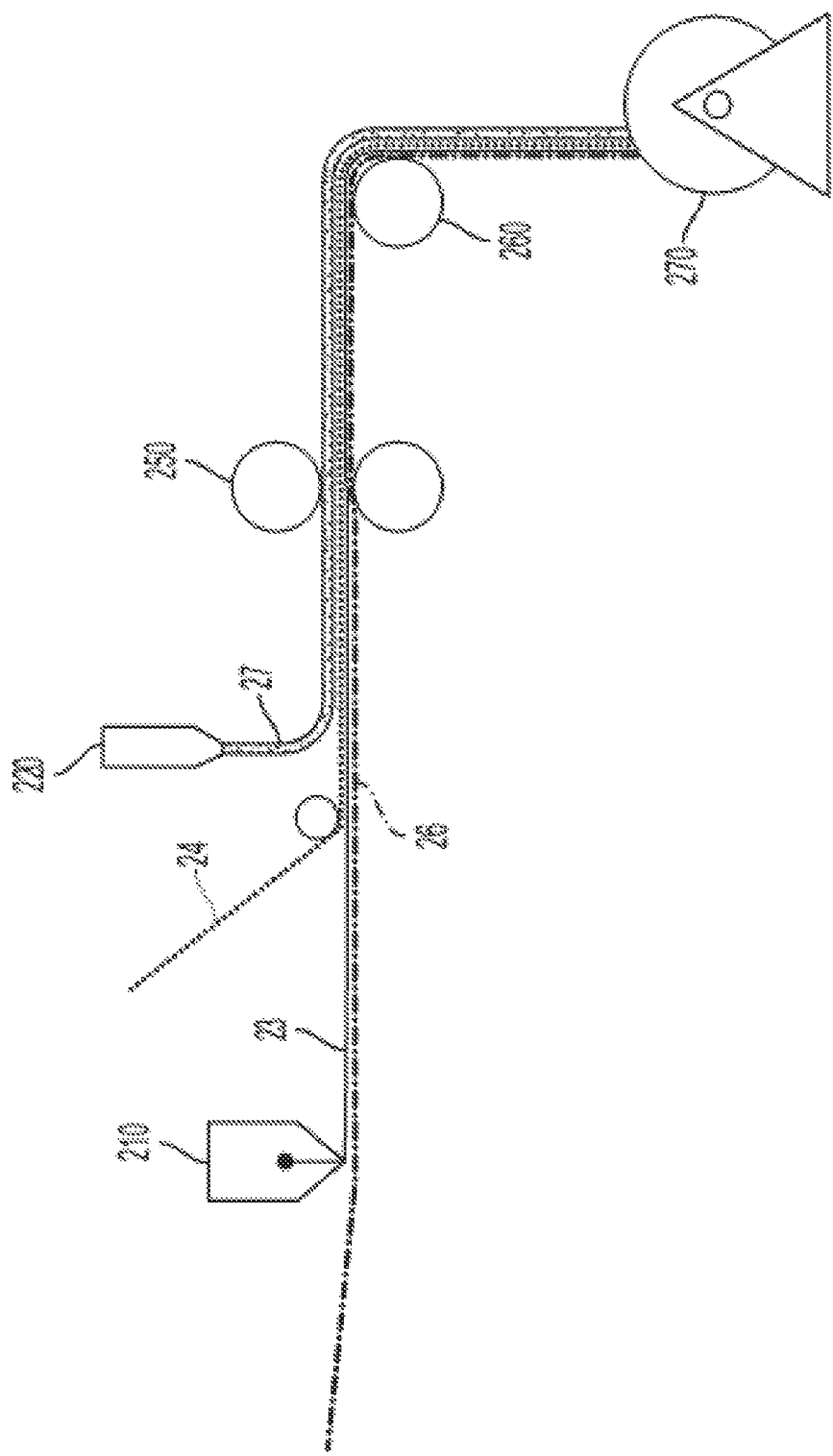
FIG. 2 is a schematic diagram of a portion of a manufacturing line utilized to produce carpet or carpet tiles according to various embodiments.
Figure 3:
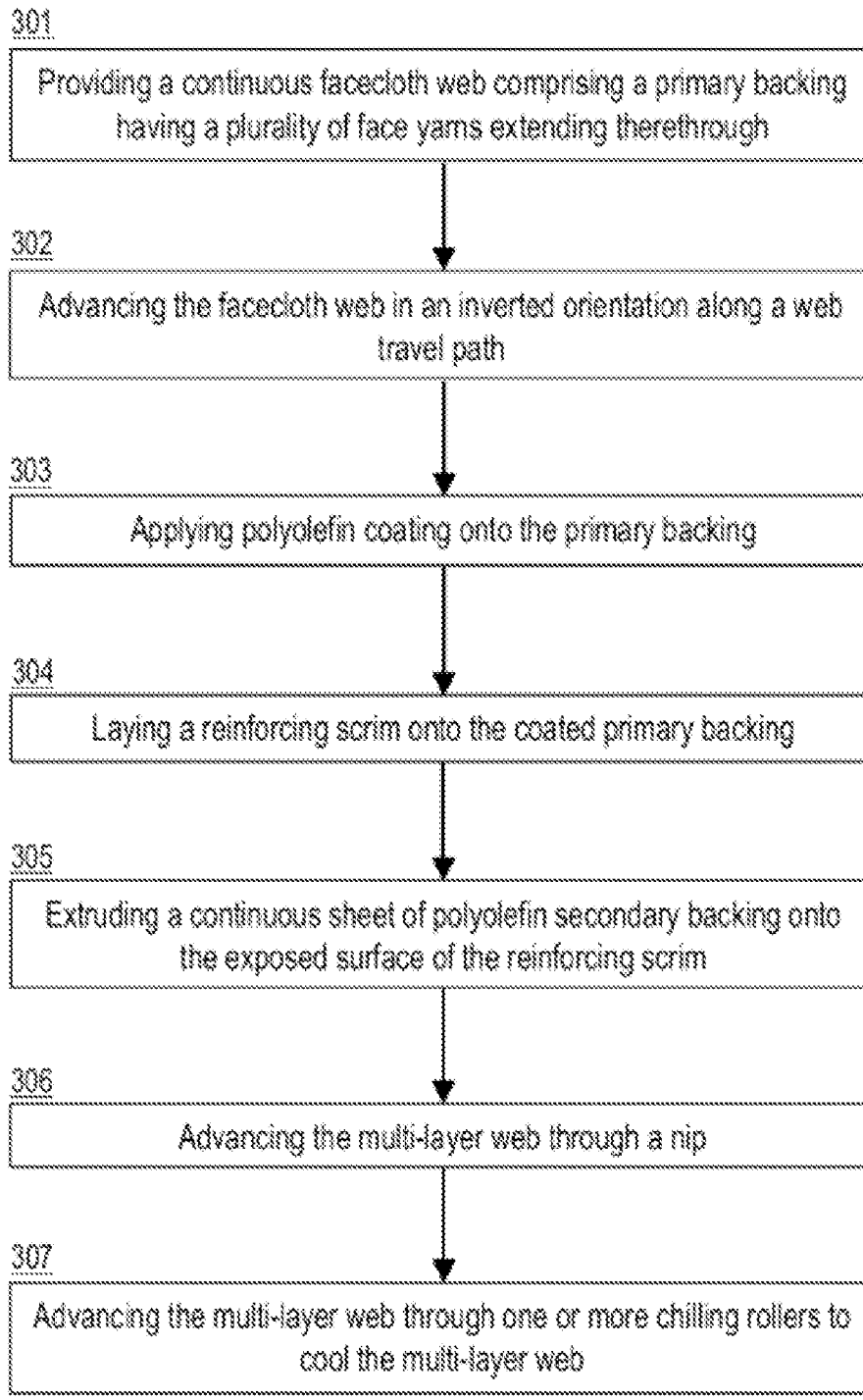
FIG. 3 is a flowchart showing various steps involved in production of a carpet or carpet tile according to various embodiments.

FIG. 2 is a schematic diagram of a portion of an example carpet tile manufacturing line that may be utilized to construct a carpet 21 as discussed herein, and FIG. 3 is a flow chart of an example method for constructing the carpet tile 21 according to certain embodiments. As discussed herein, the carpet 21 may be manufactured as a portion of a continuous web and later cut into desired tile shapes and sizes. However, it should be understood that carpet 21 may be manufactured according to any of a variety of manufacturing processes, such as a batch process in which each multi-layer carpet 21 is constructed as a separate tile component.

As shown in FIG. 2, the process begins by providing a facecloth 26 having a plurality of face yarns 22 extending through a primary backing 25 (as indicated at Block 301 of FIG. 3). As discussed herein, the topside of the facecloth 26 ultimately forms the top surface of the completed carpet 21. As mentioned, the tufted primary backing 25 is provided as a continuous web, which may be threaded along a web travel path defined by a plurality of rollers (e.g., powered rollers and/or idler rollers). In certain embodiments, the facecloth 26 may have a width between 72-80 inches, although it should be understood that the facecloth 26 may have any width with suitable production equipment.

As shown in FIG. 2, the facecloth 26 is advanced along the web travel path in an inverted orientation with the backside of the facecloth 26 facing upward, as indicated at Block 302 of FIG. 3.

The facecloth 26 will then have a polyolefin layer 23 (alternatively referred to as a polyolefinic coating) disposed on a backside of the primary backing 25, as indicated at Block 303 of FIG. 3. The polyolefin layer 23 is applied by a slot coater 210, or by any appropriate means known in the art, including a reverse roll coater or a hot melt roll from a pan onto another roller.

After the polyolefin layer 23 is applied, the reinforcing scrim layer 24 is laid onto the backside of the primary backing 25 as indicated at Block 304 of FIG. 3.

The facecloth 26 and reinforcing scrim layer 24 are then advanced past one or more extruder heads 220 configured to extrude a continuous sheet of a resin having an at least substantially uniform thickness onto the backside of the reinforcing scrim layer 24 to form the extruded polyolefin sheet 27, as indicated at Block 305. In certain embodiments, the extruder head 220 may comprise a single, elongated extrusion die tip opening extending across the entire width of the reinforcing scrim layer 24 such that the resin is extruded as a continuous sheet from the extruder head 220. Alternatively, the resin may be extruded from a plurality of extruder heads 220 positioned across the width of the web travel path. The plurality of extruder heads may be spaced such that the resin flows together to form an at least substantially continuous extruded polyolefin sheet 27 having an at least substantially uniform thickness across the width of the reinforcing scrim layer 24.

The one or more extruder heads 220 may be supplied by one or more extruders (e.g., single screw extruders and/or dual-screw extruders) configured to combine the various components of the resin prior to extrusion to form the extruded polyolefin sheet 27. Once combined, the extruders and one or more extruder heads 220 provide the at least substantially continuous sheet of resin onto the bottom surface of the facecloth 26 at a temperature between about 275-500 degrees Fahrenheit (about 135-260 degrees Celsius) and at a weight of between about 8-35 ounces per square yard (about 271-1187 $g/m^2$).

After extruding the resin of the extruded polyolefin sheet 27 onto the reinforcing scrim layer 24, the entire multi-layer web (including the facecloth 26, the reinforcing scrim layer 24, and the extruded polyolefin sheet 27) is passed through a nip 250 comprising two rollers positioned on opposite sides of the web travel path to compress the multi-layer web and to provide strong bonds between adjacent layers of the carpet 21. During compression, the reinforcing scrim layer 24 is bonded to the facecloth 26, and the extruded polyolefin sheet 27 is bonded to the reinforcing scrim layer 24, as indicated at Block 305 of FIG. 3).

After the moving multi-layer web passes through the nip 250, the web passes through one or more chilling rollers 260 to cool and harden the extruded polyolefin sheet 27 (shown at Block 306 of FIG. 3). For example, the one or more chilling rollers 260 may be collectively configured to chill the extruded polyolefin sheet 27 to approximately room temperature (between about 75-80 degrees Fahrenheit).

The cooled multi-layer construction may then be passed to a tile cutting mechanism configured to cut the multi-layer web into a plurality of individual carpet tiles or to a take-up roller 270 for storage. For example the web may be passed into a die cutter to cut the material web into market-size carpet tiles 21 (e.g., 18"×18", 24"×24", or 36"×36"). Alternatively, the material web may be taken onto a large diameter (e.g., 8-foot diameter) drum where it can be taken to an off-line die cutting station for further processing into carpet tiles 21.

The resulting multi-layer construction (which may be cut into individual carpet tiles 21) has an overall thickness that is less than similar carpet tiles having a plurality of backing layers while retaining desirable flatness characteristics of the carpet tile 21. This permits a larger number of carpet tiles 21 to be stacked in a single carton, on a single pallet, and/or the like. Moreover, the resulting carpet tiles 21 have a lower overall weight than similar carpet tiles having a plurality of backing layers. The decreased volume (due to the decreased thickness) and decreased weight lowers transportation and installation costs associated with carpet tiles 21 according to various embodiments while retaining desirable aesthetic characteristics once installed.

DISCUSSION AND EXAMPLES

Example 1

One example carpet was manufactured according to the methodology discussed herein. The example carpet tile comprises a facecloth 26 comprising a primary backing layer 25 having a weight of at least approximately 4 ounces per square yard, and having face yarns 22 tufted therethrough at a weight of at least approximately 14 ounces per square yard. The tufted primary backing is coated with a polyolefin layer 23 in an amount of at least approximately 8 ounces per square yard (271 g/m$^2$). The polyolefin layer 23 has a viscosity that is less than 2000 mPa·s as measured via capillary rheometer at 400 F according to ASTM D 3835, and penetrates the primary backing 25 and face yarns 22. The polyolefin layer is applied at a temperature between about 360-400 degrees Fahrenheit (about 182-204 Celsius).

Next, a fiberglass nonwoven reinforcing scrim layer 24 is laid onto the exposed surface of the coated primary backing layer 25. The resulting combination of facecloth 26 and fiberglass nonwoven reinforcing scrim layer 24 is passed under an extruder head 220 as a part of a continuous web, where the resin of the extruded polyolefin sheet 27 is extruded onto a backside of the reinforcing scrim layer 24 (such that the resin is extruded onto the exposed surface of the reinforcing scrim layer 24) to form the extruded polyolefin sheet 27. In this example, the extruded polyolefin sheet 27 comprises a polyolefin resin mixture heated to a temperature of 325-475 degrees Fahrenheit (163-246 degrees Celsius) for extrusion.

The resin is extruded in a continuous sheet onto the facecloth 111 to create an at least substantially uniform extruded polyolefin sheet 27 having an at least substantially uniform thickness. The polyolefins from the polyolefinic coating 23 are able to penetrate the reinforcing scrim layer 24 and interact with the polyolefins in the extruded polyolefin sheet 27. The entire resultant multi-layer web is passed through a nip 250 and through one or more chilling rollers 260 to compress all of the layers together, and to cool and harden the extruded polyolefin sheet 27. The cooled web is then cut into individual carpet tiles 21 for evaluation.

Example 2

Another example carpet is manufactured according to the methodology discussed herein. The example carpet tile comprises a facecloth 26 comprising a primary backing layer 25 having a weight of at least approximately 4 ounces per square yard, and having face yarns 22 tufted therethrough at a weight of at least approximately 14 ounces per square yard. The tufted primary backing is coated with a polyolefin layer 23 in an amount of at least approximately 8 ounces per square yard (271 g/m$^2$). The polyolefinic coating 23 has a viscosity that is less than 2000 mPa·s as measured via capillary rheometer at 400 F according to ASTM D3835, and penetrates the primary backing 25 and face yarns 22. The polyolefin layer is applied at a temperature between about 360-400 degrees Fahrenheit (about 182-204 Celsius).

The facecloth 26 is passed under an extruder head 220 as a part of a continuous web, where the resin of the extruded polyolefin sheet 27 is extruded onto a backside of the facecloth 26 (such that the resin is extruded onto the surface of the facecloth 26 which has been coated with the polyolefinic coating 23) to form the extruded polyolefin sheet 27. In this example, the extruded polyolefin sheet 27 comprises the same resin mixture as in Table 3, above, heated to a temperature of 325-475 degrees Fahrenheit (163-246 degrees Celsius) for extrusion.

The resin is extruded in a continuous sheet onto the facecloth 26 to create an at least substantially uniform extruded polyolefin sheet 27 having an at least substantially uniform thickness.

Before the extruded polyolefin sheet 27 cools to a temperature below the softening point of the resin, a fiberglass nonwoven reinforcing scrim layer 24 is laid onto the exposed surface of the extruded secondary backing layer 120, and the entire multi-layer web is passed through a nip 250 and through one or more chilling rollers 260 to embed the reinforcing scrim layer 24 into the extruded polyolefin sheet 27 and to cool and harden the extruded polyolefin sheet 27. The cooled web is then cut into individual carpet tiles 21 for evaluation.

It was found that the carpet tile 21 provided according to this example construction exhibited exceptional flatness and dimensional stability characteristics, while retaining a total weight of approximately between 40-70 ounces per square yard, and preferably approximately between 54-57 ounces per square yard, such as approximately 55 ounces per square yard.

CONCLUSION

Many modifications and other embodiments will come to mind to one skilled in the art to which this disclosure That which is claimed:

1. A method of manufacturing a carpet or carpet tile, the method comprising:
  providing a facecloth, wherein the facecloth comprises a primary backing having a plurality of face yarns extending through the primary backing;
  forming a multi-layer construction comprising the facecloth and a backing construction secured on a bottom side of the facecloth by:
    applying a polyolefinic coating onto the bottom side of the facecloth;
    pressing a first side of a reinforcing scrim layer onto the polyolefinic coating applied to the bottom side of the facecloth; and
    extruding a polyolefin-based resin onto a second side of the reinforcing scrim layer, thereby forming an extruded polyolefin sheet having a top surface which is bonded to the reinforcing scrim layer; and
  wherein the polyolefinic coating has a viscosity less than 2000 mPa·s at 400° F., and the reinforcing scrim layer comprises a composite material of a first layer of a polymer-based fiber material and a second layer of a glass fiber material.

2. The method of claim 1, wherein the polyolefinic coating comprises polyolefins and a component selected from the group consisting of a viscosity-reducing agent, and a tackifier.

3. The method of claim 2, wherein the polyolefins comprise repeat units selected from the group consisting of propylene, ethylene, and butene.

4. The method of claim 2, wherein the polyolefins comprise isotactic propylene repeat units.

5. The method of claim 1, wherein the polyolefin-based resin comprises between about 10-40 wt % polyolefins and between about 20-80 wt % of a filler material.

6. The method of claim 1, wherein the first layer of the reinforcing scrim layer comprises a plurality of nonwoven fibers.

7. The method of claim 1, further comprising:
  rolling the multi-layer construction onto a take-up roller.

8. The method of claim 1, wherein the polyolefinic coating is applied in an amount of about 8-15 ounces per square yard (about 271-509 grams per square meter).

9. The method of claim 1, wherein the facecloth comprises a primary backing web having a weight of about 18-40 ounces per square yard.

10. A method of manufacturing a carpet or carpet tile, the method comprising:
providing a facecloth, wherein the facecloth comprises a primary backing having a plurality of face yarns extending through the primary backing; and
  forming a multi-layer construction comprising the facecloth and a backing construction secured on a bottom side of the facecloth by:
    applying a polyolefinic coating onto the bottom side of the facecloth;
    extruding a polyolefin-based resin onto the bottom side of the facecloth, thereby forming an extruded polyolefin sheet having a top surface which is bonded to the facecloth; and
    pressing a first side of a reinforcing scrim layer at least partially into a bottom surface of the extruded polyolefin sheet; and
  wherein the polyolefinic coating has a viscosity less than 2000 mPa·s at 400° F., and the reinforcing scrim layer comprises a composite material of a first layer of polymer-based fiber material and a second layer of a glass fiber material.

11. The method of claim 10, wherein the polyolefinic coating comprises polyolefins and a component selected from the group consisting of a viscosity-reducing agent, and a tackifier.

12. The method of claim 11, wherein the polyolefins comprise repeat units selected from the group consisting of propylene, ethylene, and butene.

13. The method of claim 11, wherein the polyolefins comprise isotactic propylene repeat units.

14. The method of claim 10, wherein the polyolefin-based resin comprises between about 10-40 wt % polyolefins and between about 20-80 wt % of a filler material.

15. The method of claim 10, wherein the first layer of the reinforcing scrim layer comprises a plurality of nonwoven fibers.

16. The method of claim 1, further comprising:
  rolling the multi-layer construction onto a take-up roller.

17. The method of claim 10, wherein the polyolefinic coating is applied in an amount of about 8-15 ounces per square yard (about 271-509 grams per square meter).

18. The method of claim 10, wherein the facecloth comprises a primary backing web having a weight of about 18-40 ounces per square yard.

19. A carpet tile comprising:
  a facecloth comprising a primary backing and a plurality of face yarns extending through the primary backing, wherein a top side of the facecloth defines an upper surface of the carpet tile;
  a polyolefinic coating absorbed into the face yarns and present on a bottom side of the facecloth;
  an extruded polyolefin sheet formed by extruding a polyolefin-based resin; and
  a reinforcing scrim layer;
  wherein the extruded polyolefin sheet and the reinforcing scrim layer are bonded together;
  wherein the extruded polyolefin sheet is bound to the polyolefinic coating on the bottom side of the facecloth, and wherein the reinforcing scrim layer defines at least a portion of a bottom surface of the carpet tile; and
  wherein the polyolefinic coating has a viscosity less than 2000 mPa·s at 400° F., and the reinforcing scrim layer comprises a composite material of a first layer of polymer-based fiber material and a second layer of a glass fiber material.

20. The carpet tile of claim 19, wherein the polyolefins comprise repeat units of a component selected from the group consisting of propylene, ethylene, butene, and combinations thereof.

* * * * *